United States Patent
Hussain et al.

(10) Patent No.: US 9,814,106 B2
(45) Date of Patent: Nov. 7, 2017

(54) BACKLIGHT DRIVER CHIP INCORPORATING A PHASE LOCK LOOP (PLL) WITH PROGRAMMABLE OFFSET/DELAY AND SEAMLESS OPERATION

(71) Applicant: Apple Inc., Cupertino, CA (US)

(72) Inventors: Asif Hussain, San Jose, CA (US); Andrew P. Aitken, Cupertino, CA (US); Manisha P. Pandya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/502,945

(22) Filed: Sep. 30, 2014

(65) Prior Publication Data

US 2015/0116380 A1    Apr. 30, 2015

Related U.S. Application Data

(60) Provisional application No. 61/897,796, filed on Oct. 30, 2013.

(51) Int. Cl.
G09G 3/34    (2006.01)
H05B 33/08   (2006.01)

(52) U.S. Cl.
CPC ......... *H05B 33/0815* (2013.01); *G09G 3/342* (2013.01); *G09G 3/3406* (2013.01);
(Continued)

(58) Field of Classification Search
CPC .... G06F 1/10; G06F 1/06; G06F 1/08; G09G 2310/08; G09G 2320/0233;
(Continued)

(56) References Cited

U.S. PATENT DOCUMENTS 6,005,557 A * 12/1999 Wong ............... G09G 5/008
                                                 345/204
6,304,296 B1 * 10/2001 Yoneno ............ G09G 3/20
                                                 348/536
(Continued)

FOREIGN PATENT DOCUMENTS

CN    1388706    1/2003
CN    2724137    9/2005
(Continued)

OTHER PUBLICATIONS

Chinese Patent for Utility Model No. ZL201420799838.7—Utility Patentability Evaluation Report (UMPER) issued by Chinese Patent Office dated Aug. 28, 2015.
(Continued)

*Primary Examiner* — Hong Zhou
(74) *Attorney, Agent, or Firm* — McDermott Will & Emery LLP (57) ABSTRACT

The embodiments discussed herein relate to systems, methods, and apparatus for synchronizing a pulse width modulation (PWM) dimming clock signal with a frame rate signal, line sync signal, and/or a horizontal sync signal of a display device. The PWM dimming clock signal can be generated by a synchronization block having a programmable offset/delay. The programmable offset/delay can control the offset or phase difference between an input and an output clock signal of the synchronization block. Depending on the clock rate of PWM dimming and/or panel resolution, the phase/offset delay can be adjusted to achieve the optimum front of screen performance. Additionally, an input clock generator/missing pulse detection block can output a programmed clock signal to the synchronization block in case of a missing external clock, or insert a pulse when there is a missing pulse detected.

19 Claims, 8 Drawing Sheets

(52) U.S. Cl.
CPC . *G09G 2310/08* (2013.01); *G09G 2320/0233* (2013.01); *G09G 2320/064* (2013.01); *Y02B 20/346* (2013.01)

(58) Field of Classification Search
CPC .......... G09G 2320/064; G09G 3/3406; G09G 3/342; H05B 33/0815; Y02B 20/346
USPC ........ 345/90, 98–99, 102, 204–214; 348/536
See application file for complete search history.

(56) References Cited

U.S. PATENT DOCUMENTS

| | | | |
|---|---|---|---|
| 6,414,528 B1* | 7/2002 | Usui | G06F 1/06 327/158 |
| 6,621,480 B1* | 9/2003 | Morita | G09G 5/008 345/213 |
| 6,731,343 B2* | 5/2004 | Yoneno | G09G 3/20 348/537 |
| 6,771,281 B2 | 8/2004 | Takagi | |
| 7,373,571 B2* | 5/2008 | Acharya | G01R 31/318594 327/261 |
| 8,035,315 B2 | 10/2011 | Zhao et al. | |
| 8,164,367 B1* | 4/2012 | Bal | H03L 7/16 327/157 |
| 8,569,965 B2 | 10/2013 | Uchimoto et al. | |
| 8,884,867 B2 | 11/2014 | Hussain et al. | |
| 9,345,083 B2 | 5/2016 | Hussain et al. | |
| 2001/0022523 A1* | 9/2001 | Takami | G09G 5/008 327/156 |
| 2002/0113780 A1* | 8/2002 | Narui | G09G 1/165 345/204 |
| 2002/0180745 A1 | 12/2002 | Matsuda et al. | |
| 2003/0058052 A1* | 3/2003 | Birk | G06F 1/04 331/1 A |
| 2007/0024574 A1* | 2/2007 | Wu | G09G 3/3406 345/102 |
| 2007/0121773 A1* | 5/2007 | Kuan | H03L 7/081 375/376 |
| 2009/0261789 A1 | 10/2009 | Chang et al. | |
| 2011/0001739 A1 | 1/2011 | Yamagishi | |
| 2011/0128303 A1* | 6/2011 | Yonemaru | H05B 33/0827 345/690 |
| 2011/0273433 A1 | 11/2011 | Ahn et al. | |
| 2011/0316449 A1 | 12/2011 | Imanaka | |
| 2012/0068978 A1 | 3/2012 | Aitken et al. | |
| 2013/0169697 A1 | 7/2013 | Park et al. | |
| 2013/0242621 A1* | 9/2013 | Hussain | H02M 1/44 363/21.12 |

FOREIGN PATENT DOCUMENTS

| | | |
|---|---|---|
| CN | 201657109 | 11/2010 |
| CN | 101944348 | 1/2011 |
| CN | 102257881 A | 11/2011 |
| JP | 2000242233 | 9/2000 |
| TW | 530294 B | 5/2003 |
| TW | 200504634 A | 2/2005 |
| TW | 201220282 A | 5/2012 |
| TW | 201228462 A | 7/2012 |
| TW | 201342357 A | 10/2013 |

OTHER PUBLICATIONS

Taiwanese Patent Application No. 103137269—Office Action dated Dec. 24, 2015.
Chinese Patent Application No. 201410784297.5—First Office Action dated Aug. 1, 2016.
Chinese Patent Application No. 201410784297.5—Search Report dated Aug. 1, 2016.

* cited by examiner

BACKLIGHT DRIVER CHIP INCORPORATING A PHASE LOCK LOOP (PLL) WITH PROGRAMMABLE OFFSET/DELAY AND SEAMLESS OPERATION

CROSS-REFERENCE TO RELATED APPLICATIONS

The present application claims the benefit of U.S. Provisional Application No. 61/897,796, entitled "BACKLIGHT DRIVER CHIP PHASE LOCK LOOP (PLL) WITH PROGRAMMABLE OFFSET/DELAY" filed Oct. 30, 2013, the contents of which is incorporated herein by reference in its entirety for all purposes.

The present application is also related to U.S. application Ser. No. 14/503,037, entitled "BOOST CONVERTER WITH A PULSE FREQUENCY MODULATION MODE FOR OPERATING ABOVE AN AUDIBLE FREQUENCY" filed concurrently herewith, the contents of which is incorporated herein by reference in its entirety for all purposes.

FIELD OF THE DESCRIBED EMBODIMENTS

The described embodiments relate generally to systems, methods, and apparatus for improving display devices using a backlight driver chip. Specifically, the embodiments relate to incorporating a programmable delay into a backlight driver chip to improve FOS (front of screen) performance of a display device.

BACKGROUND

Display devices have in recent times been adapted to project a wide variety of media not limited to video games, movies, applications, among many other forms of media. However, when executing certain media data or transitioning between applications that execute the media data, certain artifacts can appear at the display device. Such artifacts can include flickering or shimmering, which can occur from errors in line synchronization. When lines of a display device are not synchronized during the execution of a respective frame, a user can be distracted by such discrepancies thereby disturbing the user experience during use of the display device.

SUMMARY

This paper describes various embodiments that relate to systems, methods, and apparatus for synchronizing a clock signal with one or more signals of a display device using a programmable offset. In some embodiments, a control circuit for a display device is set forth. The control circuit can include a phase detection module configured to concurrently receive a frequency-scaled (FS) feedback signal and an input clock signal. Additionally, the phase detection module can provide a phase adjustment signal to a voltage controlled oscillator (VCO) based on a phase difference between the FS feedback signal and the input clock signal. The VCO can be configured to generate an output clock signal based on the phase adjustment signal. The control circuit can further include a delay module configured to offset a pulse edge of the output clock signal from a pulse edge of the input clock signal to synchronize the output clock signal with a periodic signal being transmitted in the display device.

In other embodiments, a machine-readable non transitory storage medium is set forth. The storage medium can store instructions that, when executed by a processor included in a computing device, cause the computing device to carry out steps that include concurrently receiving a frequency-scaled (FS) feedback signal and an input clock signal. Additionally, the steps can include generating a phase adjustment signal based on a phase difference between the FS feedback signal and the input clock signal, and generating an output clock signal based on the phase adjustment signal. Furthermore, the steps can include offsetting a pulse edge of the output clock signal from a pulse edge of the input clock signal to synchronize the output clock signal with a periodic signal being transmitted in a display device.

In yet other embodiments, a computing device is set forth. The computing device can include a processor and a display circuit. The display circuit can include a phase detection module configured to concurrently receive a feedback signal and an input clock signal. Additionally, the phase detection module can be configured to provide a phase adjustment signal to a voltage controlled oscillator (VCO) based on a phase difference between the feedback signal and the input clock signal. The VCO can be configured to generate an output clock signal based on the phase adjustment signal. The display circuit can further include a delay module comprising a plurality of multiplexers each electrically coupled to a gate delay. Each gate delay can be configured to offset a pulse edge of the output clock signal from a pulse edge of the input clock signal to synchronize the output clock signal with a periodic signal being transmitted in the display device.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments discussed herein relate to systems, methods, and apparatus for introducing a programmable delay into a synchronization module of a display device. By introducing the programmable delay, the phase of an output clock signal from the synchronization module can be modified to provide improvements in front of screen (FOS) performance. Such improvements can manifest as a result of a successful synchronization of an output clock signal with a frame rate signal, line sync signal, and/or horizontal sync signal of a display device. A phase lock loop (PLL) can be used in combination with the programmable delay in order provide a supplemental mechanism to control the offset or phase difference between an input clock signal (e.g., a frame rate signal, horizontal sync signal, and/or line sync signal) and the output clock signal (e.g., a clock for a pulse width modulation (PWM) dimming generator). Depending on a clock rate of a PWM dimming generator or panel resolution of a display device, the phase/offset delay of the output clock signal can be adjusted to improve synchronization and thus optimize front of screen performance. In some embodiments, an input clock generator and/or missing pulse detection module can be communicatively coupled to the synchronization module for providing an un-interrupted output clock signal. For example, the synchronization module can output a programmed clock signal upon detecting a missing external clock signal, or provide a supplemental pulse upon detecting a missing pulse in an input clock signal.

These and other embodiments are discussed below with reference to FIGS. 1-8; however, those skilled in the art will readily appreciate that the detailed description given herein with respect to these figures is for explanatory purposes only and should not be construed as limiting.

Figure 1:
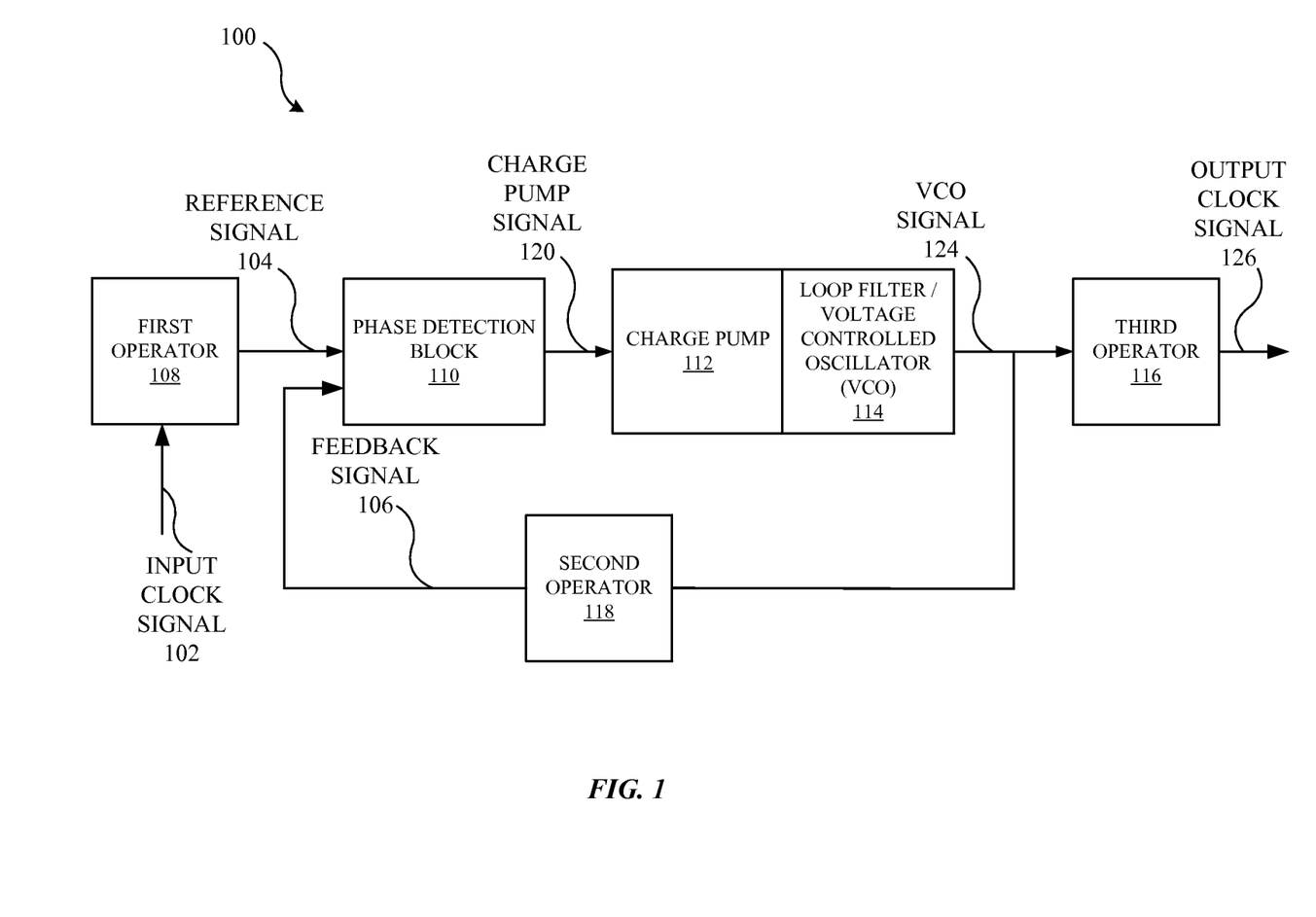
FIG. 1 illustrates a system diagram of a system for synchronizing multiple clock signals according to some embodiments discussed herein.

FIG. 1 illustrates a system diagram of a system 100 for synchronizing multiple clock signals according to some embodiments discussed herein. The system 100 illustrated in FIG. 1 operates as a phase lock loop (PLL) that calculates a phase or frequency difference between the input clock signal 102 and a feedback signal 106 in order to generate an output that is synchronized with the input clock signal 102. The feedback signal 106 can be based voltage controlled oscillator (VCO) output clock signal 126 generated by a VCO 114, which is also configured to provide an output clock signal 126. The output clock signal 126 can have a frequency that is greater than, equal to, or less than the input clock signal 102 depending on the configuration of the system 100. The system 100 can be used for synchronizing of an output clock signal 126 with an input clock signal 102 corresponding to a frame rate signal, line sync signal, or horizontal sync signal of a display device, in some embodiments. Additionally, the system 100 can include a phase detection block 110, which can be configured to receive multiple inputs and compare the inputs in order to provide an output that is representative of a phase difference between the multiple inputs. For example, when the multiple inputs include two periodic signals separated by a phase difference, the output of the phase detection block 110 can be proportional to or otherwise representative of the phase difference. The system 100 effectively can operate using one or more hardware and/or software modules in some embodiments.

The inputs received at the phase detection block 110 are the feedback signal 106 and a reference signal 104 provided by a first operator 108. The first operator 108 can be an arithmetic operator configured to perform an arithmetic operation on the input clock signal 102. The arithmetic operation can include division, multiplication, derivative, integral, and/or any other suitable arithmetic operation. For example, in some embodiments, the first operator 108 is configured to divide a frequency of the input clock signal by a value "A" in order to increase or decrease the frequency of the input clock signal and generate the resulting reference signal 104. Thereafter, the reference signal 104 and the feedback signal 106 are compared by the phase detection block 110 and a charge pump signal 120 is generated as a result. The charge pump signal 120 is a signal representative of the phase difference between the inputs to the phase detection block 110. The charge pump signal 120 can be defined as either an up signal or a down signal depending on whether a frequency or phase of the feedback signal 106 is lagging or leading a frequency or phase of the reference signal 104 respectively. The charge pump signal 120 will be an up signal when the frequency and/or phase of the feedback signal 106 are lagging the frequency of the reference signal 104. The charge pump signal 120 will be a down signal when the frequency or phase of the feedback signal 106 is leading the frequency of the charge pump signal 120. Otherwise, a null signal or no signal will be generated by the phase detection block 110 when the inputs to the phase detection block are not leading or lagging each other.

A charge pump 112 of the system 100 receives the charge pump signal 120 and can generate a charge signal having a voltage or current proportional to the charge pump signal 120. The charge signal can be provided to a loop filter/voltage controlled oscillator (VCO) 114 of the system 100. The loop filter of the loop filter/VCO 114 is a circuit or module that can be configured to filter the charge signal. The VCO of the loop filter/VCO 114 is an oscillator configured to supply an output signal based on a signal supplied to the VCO. For example, the voltage supplied to the VCO can be based on the charge pump signal. Current can be drawn from the loop filter when the charge pump signal is indicative of a down signal, and current can be driven into the loop filter when the charge pump signal is indicative of an up signal. Based on the current drawn from or driven into the loop filter/VCO 114, the loop filter/VCO 114 can be biased in order to modify a frequency of an oscillating output of the loop filter/VCO 114. For example, when current is drawn from the loop filter, the frequency of the VCO signal 124 can be decreased, but when current is driven to the loop filter, the frequency of the VCO signal 124 can be increased.

The feedback signal 106 can be provided to one or more operator modules in order to modify a frequency of the feedback signal 106. As illustrated in FIG. 1, the feedback signal 106 is the output of a second operator 118 that is configured to modify a frequency of the feedback signal 106 before the feedback signal 106 is provided to the phase detection block 110. In this way, the VCO signal 124 can have a frequency that is different than the input clock signal 102 and/or the reference signal 104 depending on the operation performed by the second operator 118. In some embodiments, the second operator 118 can perform one or more arithmetic operations not limited to division, multiplication, integration, derivation, and/or any other suitable arithmetic operation. For example, in some embodiments, the second operator 118 can be configured to divide a frequency of the VCO signal 124 by a value "B" in order to modify a frequency of the resulting feedback signal 106. In other embodiments, the second operator 118 can be configured to multiple the frequency of the VCO signal 124 by a value "B" in order to modify the frequency of the feedback signal 106. Thereafter, the phase detection block 110 will determine the difference in frequency or phase between the reference signal 104 and the feedback signal 106, output a charge pump signal 120, and cause the VCO signal 124 to have a frequency equal to a frequency of the reference signal 104 scaled by the value "B" (e.g., divided or multiplied by the value "B"). The value "B" can be any number or fraction suitable for modifying a frequency of a periodic signal.

Additionally, a third operator 116 can be configured to perform an arithmetic operation on a frequency of the VCO signal 124 in order to modify a frequency of the VCO signal 124. The third operator 116 can be configured to perform one or more arithmetic operations not limited to division, multiplication, integration, derivation, and/or any other suitable arithmetic operation. For example, in some embodiments, the third operator 116 can be configured to divide or multiply a frequency of the VCO signal 124 by a value "C" in order to modify the frequency of the VCO signal 124. Thereafter, third operator 116 can generate an output clock signal 126, which can have a frequency equal to, greater than, or less than the input clock signal 102. The frequency of the output clock signal 126 can depend on how the system 100 is configured to modify certain frequencies of the various signals being transmitted within the system 100. Additionally, it should be noted that the first operator 108, second operator 118, and/or third operator 116 can be optional in any of the embodiments discussed herein.

Figure 2:
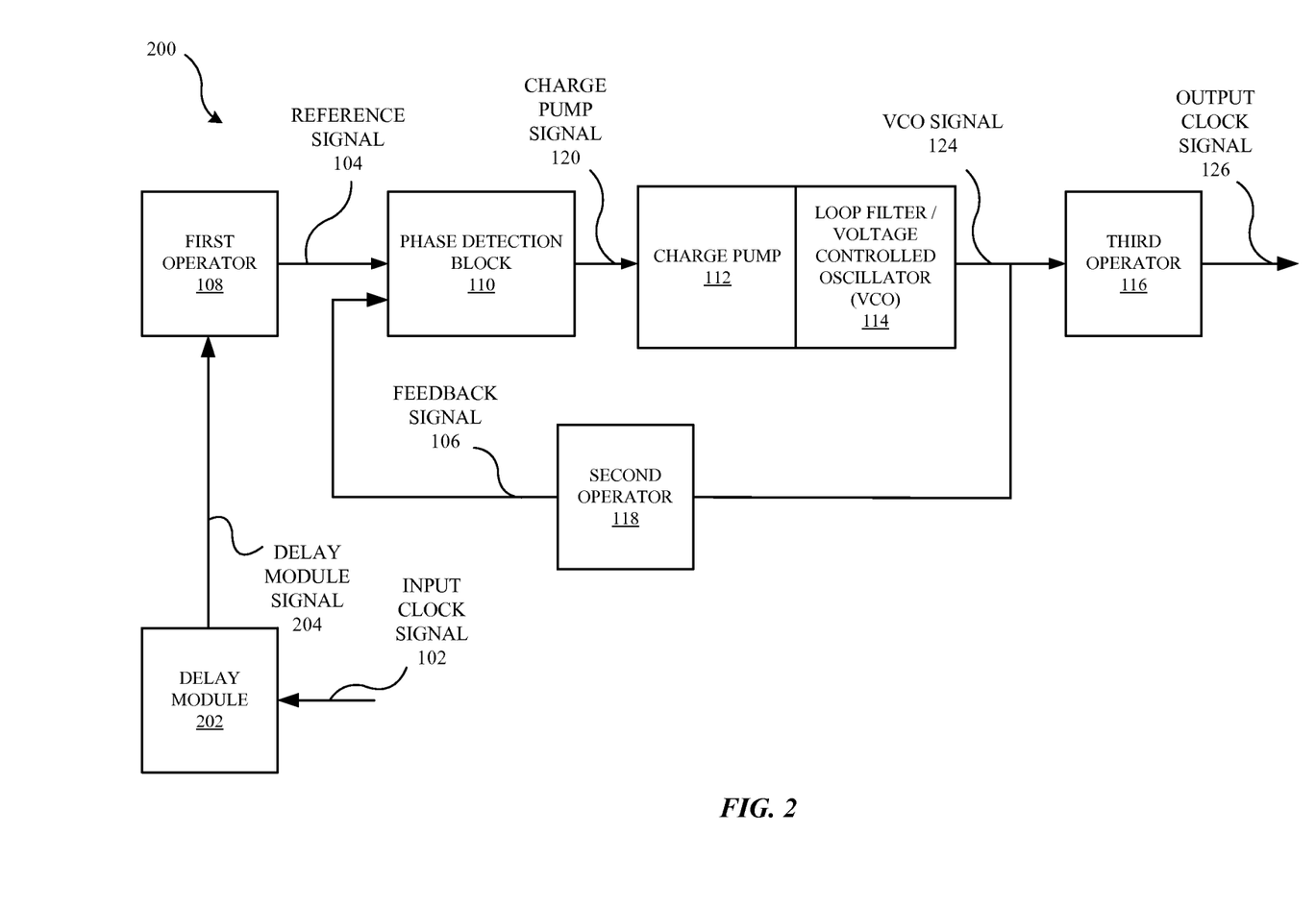
FIG. 2 illustrates a system diagram of a system for synchronizing multiple clock signals according to some embodiments discussed herein.

FIG. 2 illustrates a system diagram of a system 200 for synchronizing multiple clock signals according to some embodiments discussed herein. The system 200 can include the elements of the system 100 of FIG. 1, but incorporating a delay module 202. The delay module 202 can be a hardware or software module configured to delay an input received at the delay module 202. The delay module 202 can be a programmable module in some embodiments. In this way, the input to the delay module 202 can be varied by one or more delay periods defined by a programmable offset of the delay module 202. In some embodiments, the delay module is a programmable delay circuit (e.g., an 8-bit programmable delay circuit) capable of providing numerous delay values for delaying the input to the delay module 202. For example, the delay module 202 can receive the input clock signal 102 and delay the input clock signal 102 by any suitable time delay or offset value. The time delay value can be greater than, equal to, or less than a period of the input clock signal 102. Additionally, the time delay value can be any suitable fraction of the period of the input clock signal 102. As a result, the delay module 202 will delay the input clock signal 102 and generate a delay module signal 204.

The first operator 108 can be configured to perform an arithmetic operation on the delay module signal 204 in order to generate a reference signal 104 for the phase detection block 110. The phase detection block 110 will thereafter generate a charge pump signal 120 based on a comparison between a frequency or phase of the reference signal 104 and a frequency or phase of the feedback signal 106. The charge pump signal 120 generated as a result of the comparison can thereafter cause the VCO 114 to generate a VCO signal 124, which is then output to the third operator 116 in order to provide the output clock signal 126. By using the delay module 202 to modify the operations of the system 200 and shift the input clock signal 102, synchronization of one or more clock signals can be optimized. The clock signals can correspond to a frame rate signal, horizontal sync signal, and/or line sync signal of a display device. For example, a clock signal can be shifted from a horizontal sync signal of a display device. In response, the delay module 202, as well as other portions of the system 200, can be used to synchronize the clock signal with the horizontal sync signal (e.g., lining up the edges of a clock signal pulse with the edges of a horizontal sync pulse). Additionally, the delay module 202 can be used to intentionally offset an input clock signal 102 in order to provide symmetric spacing between multiple signals generated at a display device or subsystem of the display device.

Figure 3:
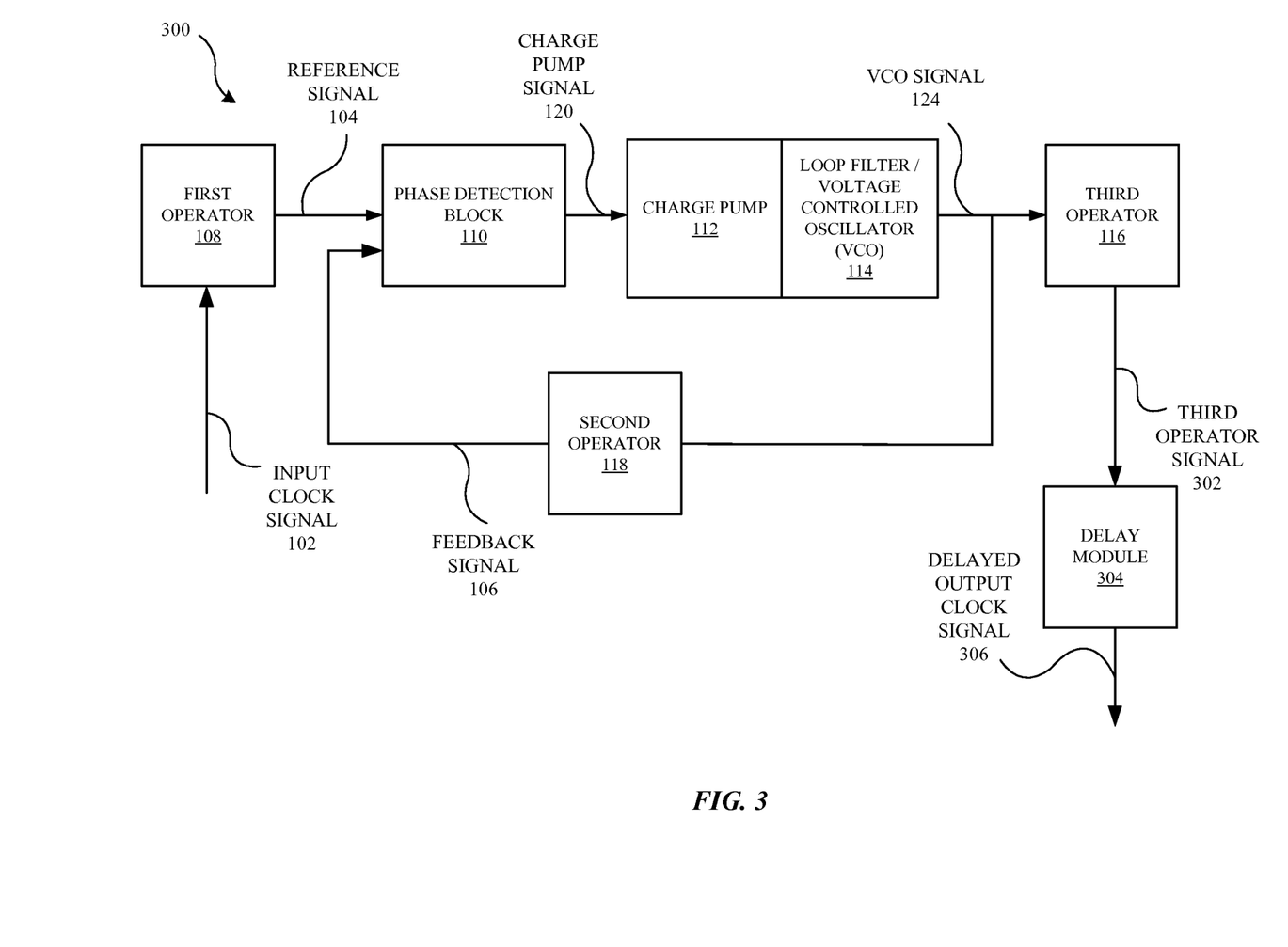
FIG. 3 illustrates a system diagram of a system for synchronizing multiple clock signals according to some embodiments discussed herein.

FIG. 3 illustrates a system diagram of a system 300 according to some embodiments herein. The system 300 can include the elements of the system 100 and system 200 of FIGS. 1 and 2 respectively, while also incorporating the delay module 202 to modify an output of the system 300. The delay module 202 can be configured to receive a third operator signal 302 from the third operator 116 and delay the third operator signal 302 by a time delay value in order to generate a delayed output clock signal 306. In some embodiments, the delay module 304 can be directly coupled to the VCO 114 in order to receive the VCO signal 124 and delay the VCO signal 124 in order to generate the delayed output clock signal 306. By delaying a signal at the output of the system 300, the delay module 304 can be used to correct or improve the synchronization of one or more clock signals with a corresponding to frame rate signal, horizontal sync signal, and/or line sync signal. Additionally, the delay module 304 can be used to intentionally offset an output clock signal in order to improve the synchronization of one or more signals generated at a display device or subsystem of the display device.

Figure 4:
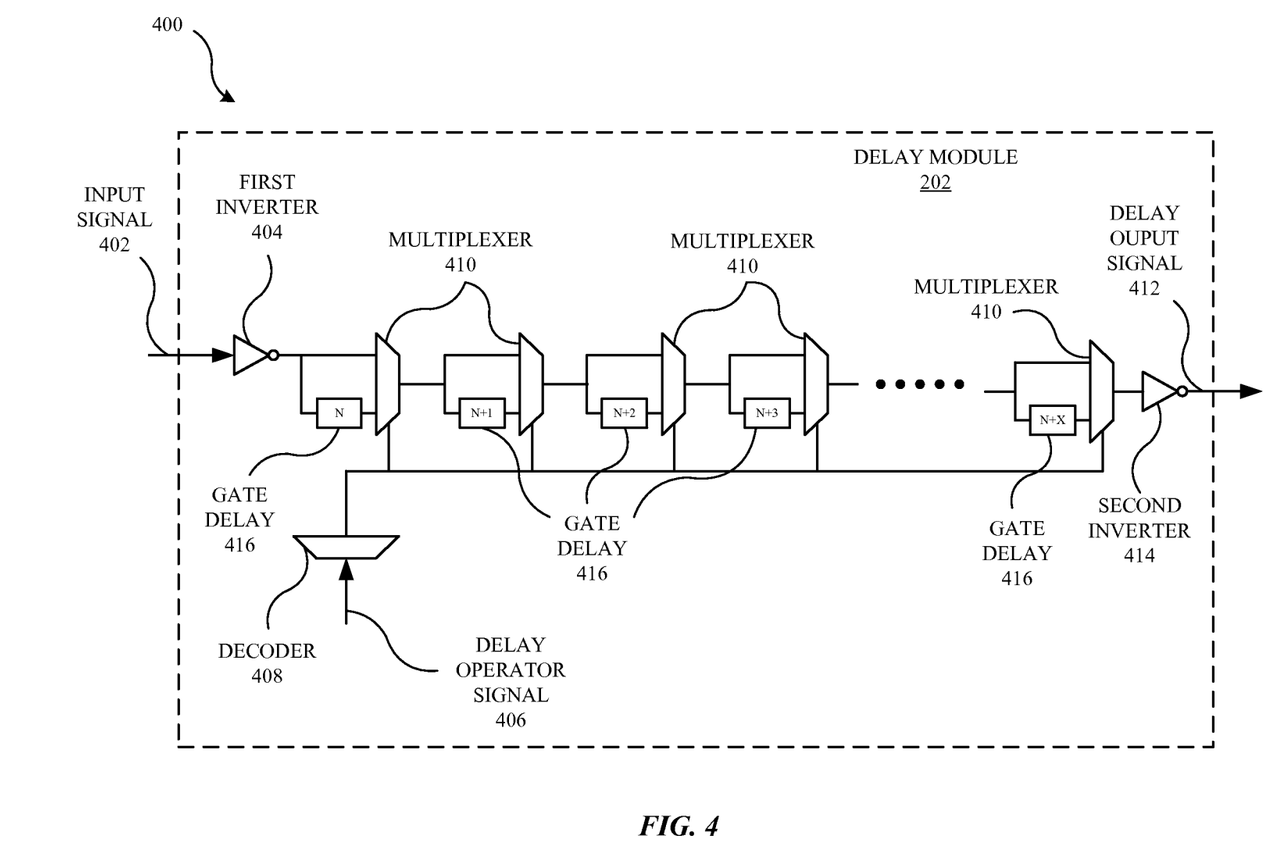
FIG. 4 illustrates a system diagram of a delay module according to some embodiments.

FIG. 4 illustrates a system diagram 400 of the delay module 202 according to some embodiments. The delay module 202 can receive an input signal 402 from the VCO 114 or the third operator 116 and thereafter delay the input signal 402 in order to generate the delayed output signal 412. The delay module 202 can include a first inverter 404 that is configured to invert the input signal 402. In this way, if the input signal 402 is a positive or logical high value, the first inverter 404 will cause the input signal 402 to be a negative or logical low value. Alternatively, if the input signal 402 is a negative or logical low value, the first inverter 404 will cause the input signal 402 to be a positive or logical high value. Once the input signal 402 is inverted it is provided to one or more multiplexers 410 and/or gate delays 416. The multiplexers 410 act to switch between two inputs: the first inverter 404 or an output of an adjacent multiplexer 410, and an output of the one of the gate delays 416. The multiplexers 410 can be switched between their respective inputs to only allow one of the inputs to pass through the multiplexer 410. The switching can be controlled by a delay operator signal 406 that is decoded by a decoder 408 and provided to each of the multiplexers 410. When the delay operator signal 406 indicates that no delay should be applied to the input signal 402, each multiplexer 410 will be switched to their respective input that does not include a gate delay 416. When the delay operator signal 406 indicates that the maximum amount of delay should be applied to the input signal 402, each multiplexer 410 will be switched to their respective input that includes the gate delay 416. In this way, the inverted input signal will have to pass through each gate delay 416 creating a cumulative delay effect on the inverted input signal. Thereafter, the inverted input signal (delayed or not delayed) will pass through a second inverter 414 where the inverted input signal will be inverted again. The ultimate output of the delay module 202 will be a delayed output signal 412. The amount of delay applied at the delay module 202 can depend on the number of multiplexers 410, the activity of the multiplexers 410, and the delay operator signal 406. In some embodiments, the delay operator signal 406 can be configured to provide multiple different delay values for switching multiple multiplexers to their respective gate delays 416. The multiplexers 410 can be switched at each period of the input signal 402, multiple times during a period of the input signal 402, and/or the multiplexers 410 can be left idle during a period of input signal 402. In some embodiments, the delay operator signal 406 can be an 8-bit signal capable of causing 256 different delay times to be applied to the input signal 402. In other embodiments, the delay operator signal 406 is more or less than 8-bits.

Figure 5:
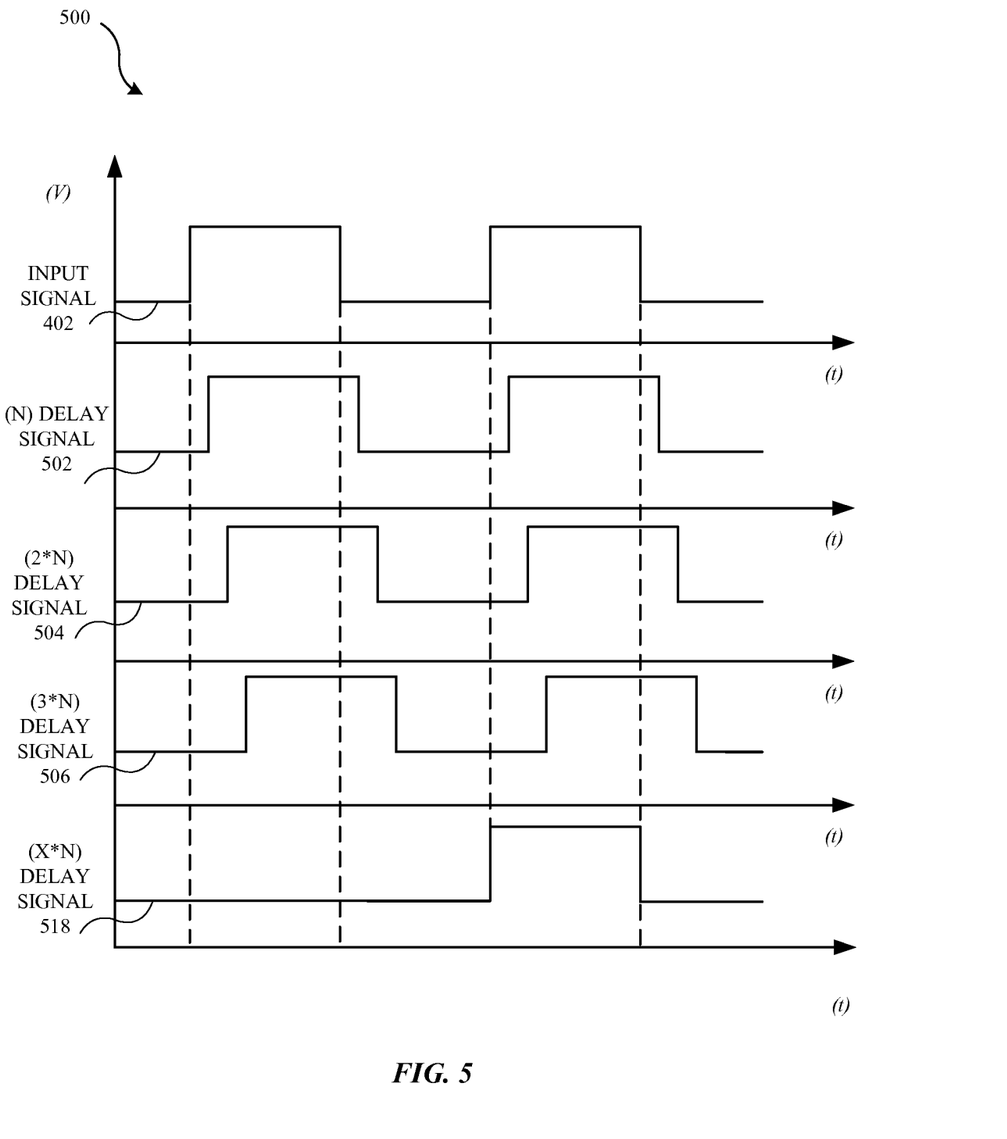
FIG. 5 illustrates a plot of an input signal shifted by a plurality of multiplexers and gate delays according to some embodiments discussed herein.

FIG. 5 illustrates a plot 500 of how the input signal 402 can be shifted according to the multiplexers 410 and gate delays 416 discussed with respect to FIG. 4. The plot 500 includes an axis for time (t) and voltage (V), and sets forth an observable a period of the input signal 402. When a single gate delay 416 is applied to the input signal 402 according to the delay operator signal 406, the input signal 402 will experience a delay similar to the (N) delay signal 502. When the input signal 402 experiences two gate delays 416, the input signal 402 will experience a delay similar to the (2*N) delay signal 504. When the input signal 402 experiences three gate delays as a result of three multiplexers 410 switching to their respective gate delay 416 inputs, the input signal 402 will experience the (3*N) delay signal 506. This can be reproduced for any suitable number of gate delays 416 in order to delay the input signal 402. The input signal 402 can be delayed a full period according to the switching of a certain number of gate delays 416 in order to generate the (X*N) delay signal 518. However, it should be noted that an X*N delay can generate any length of delay depending on the configuration of each gate delay 416, where N is the delay of a single gate delay 416 and X is a constant multiplier that indicates the total number of gate delays 416 used to delay the input signal 402. By delaying an input signal 402 such as a clock input, improved edge alignment can be achieved when synchronizing the clock input with another signal such as a line sync signal, horizontal sync signal, or frame rate signal of a display device.

Figure 6:
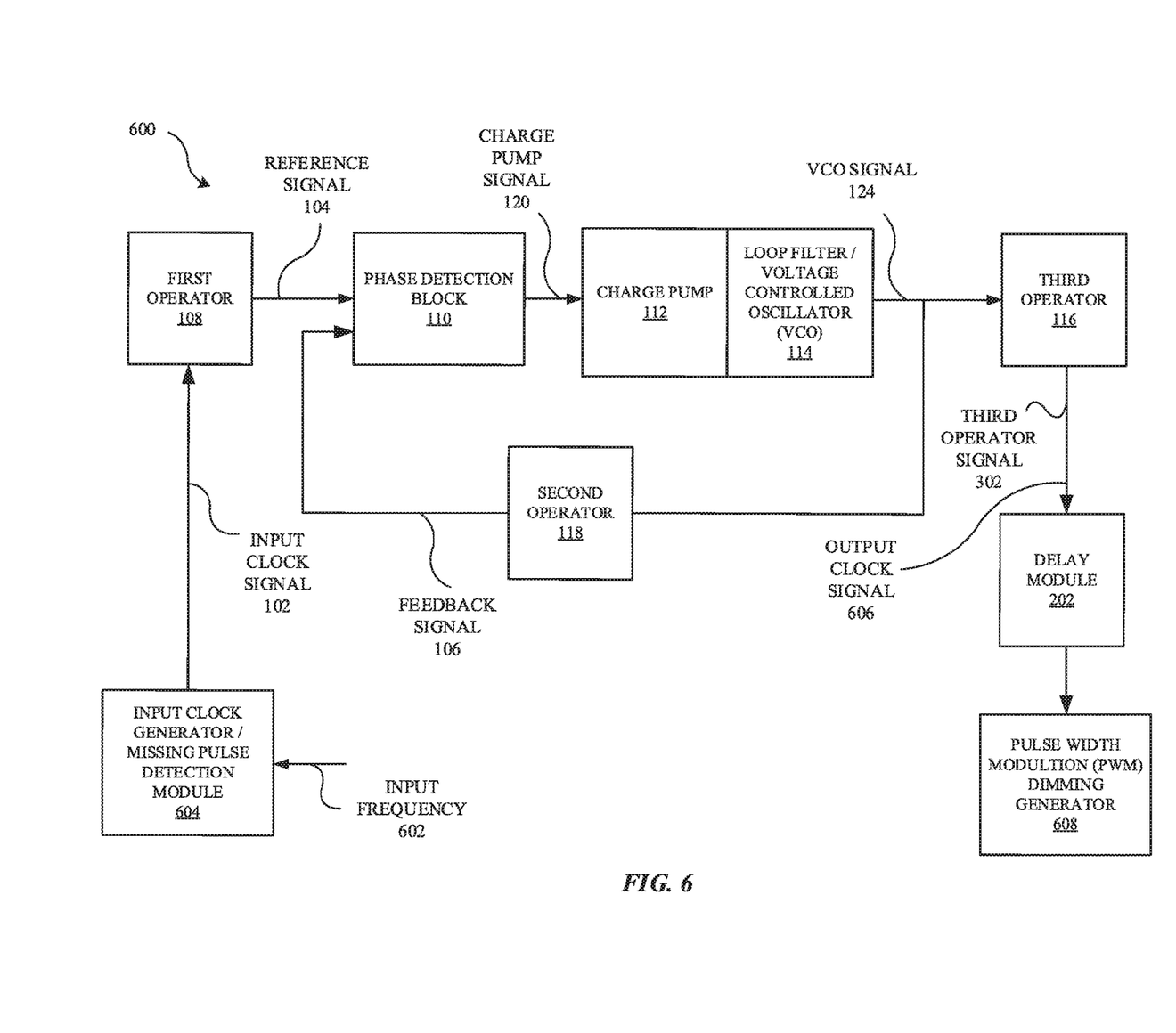
FIG. 6 sets forth an embodiment of a backlight driver device according to some embodiments discussed herein.

FIG. 6 illustrates a system 600 for synchronizing an operating frequency of a pulse width modulation (PWM) dimming generator 608 with an input clock signal 102 such as a frame rate signal, line sync signal, or horizontal sync signal. The system 600 can be implemented in hardware and/or software in order to achieve accurate synchronization between signals. The system 600 can receive an input frequency 602 that defines the frequency for an input clock generator 604. The input clock generator and/or missing pulse detection module 604 can provide an oscillating signal that is to be synchronized or otherwise modified by the system 600 in order to provide an output clock signal 606 that is synchronized with the input clock signal 102. The input clock generator and/or missing pulse detection module 604 can be configured to detect a missing pulse in the input clock signal 102 and modify the input clock signal 102 to include one or more supplemental pulses to account for any missing pulses detected. In this way, the output clock signal 606 will be provided to the PWM dimming generator 608 un-interrupted.

The system 600 can include one or more of the blocks or modules of the system 100, 200, and/or 300. For example, a frequency of the input clock signal 102 can be divided by a value "A" at the first operator 108 in order to increase or decrease the frequency of the reference signal 104 that is provided to the phase detection block 110. In this way, the output clock signal 606 can be modified to be greater than or less than the input clock signal 102. Additionally, the output clock signal 606 can be delayed by the delay module 202. In this way, pulses of the output clock signal 606 can be delayed by a particular time delay value for a particular period of the output clock signal 606. In some embodiments, the time delay value applied to the output clock signal 606 can change after one or more periods of the output clock signal 606. The system 600 can dynamically provide multiple means for synchronizing the output clock signal 606 provided to the PWM dimming generator 608 with the input clock signal 102. As a result, certain unattractive artifacts that appear at a display device can be minimized using the system 600. For example, when the PWM dimming generator 608 is out of sync with an input signal 402, shimmering and flickering can occur at the display device. However, when the PWM dimming generator 608 operates in sync with a frame rate signal, line sync signal, and/or horizontal sync signal of the display device, such artifacts vanish thereby providing a smooth and crisp output at the display device.

In some embodiments, the system 600 can use an 8-bit programmable delay at the delay module 202 in order to allow the phase of the output clock signal 606 to be controlled dynamically according to multiple programmable delay values. Specifically, the delay module 202 can be configured to offset or delay the input clock signal 102 (e.g., the frame rate signal, horizontal sync signal, or line sync signal) or the output clock signal 606 (e.g., the clock signal for the PWM dimming generator 608) in order to synchronize the respective input and output clock signals. In this way, the clock rate of PWM dimming generator 608 and/or a panel resolution of a display device can be adjusted by a certain phase/offset delay to achieve an improved or an optimum front of screen (FOS) performance.

Figure 7:
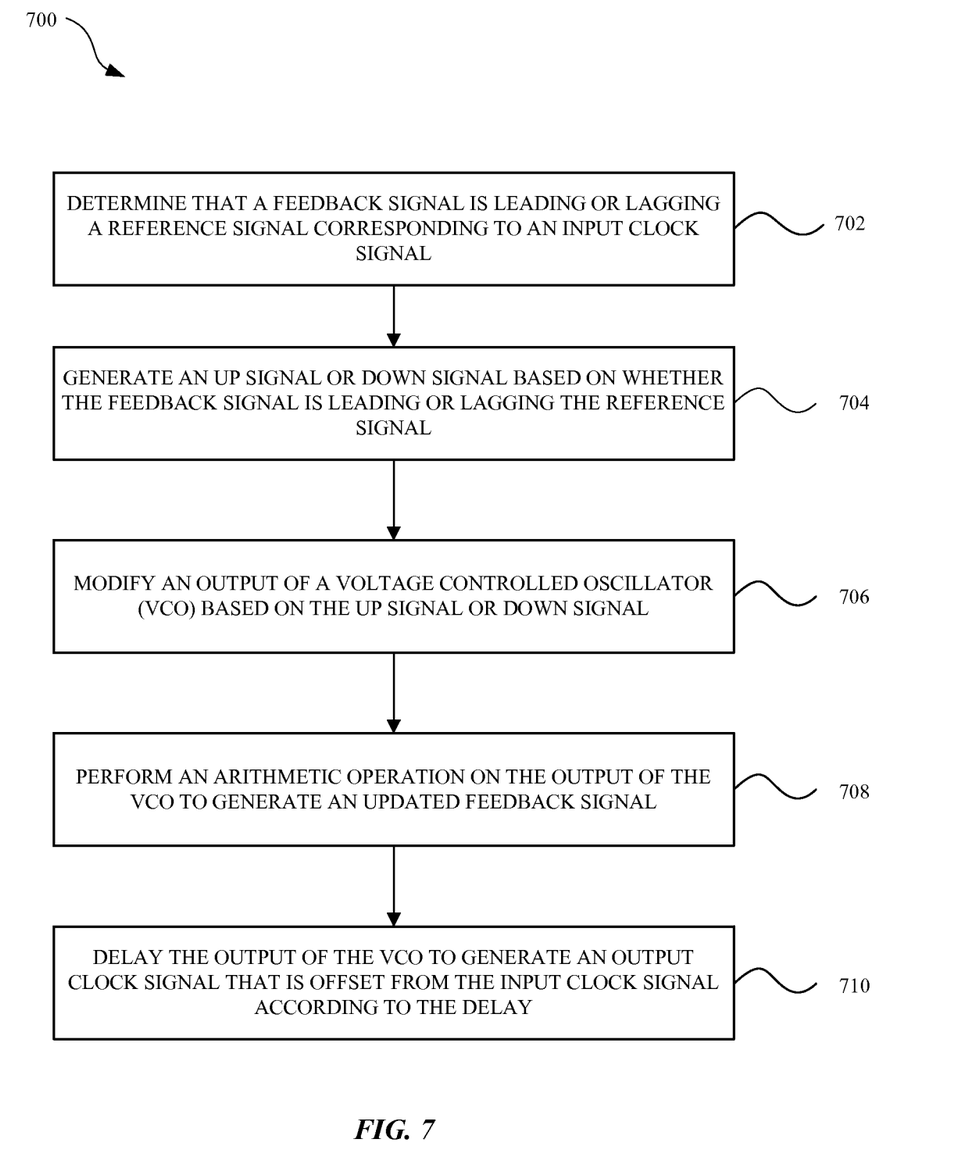
FIG. 7 illustrates a method for delaying an output clock signal in order to optimize the synchronization of the output clock signal with an input clock signal.

FIG. 7 illustrates a method 700 for delaying an output clock signal in order to optimize the synchronization of the output clock signal with an input clock signal. The method 700 can be performed by any apparatus, system, or module discussed herein. The method 700 includes a step 702 of determining that a feedback signal is leading or lagging a reference signal associated with an input clock signal. At step 704, an up or down signal is generated based on whether the feedback signal is leading or lagging the reference signal. For example, if the feedback signal is leading the reference signal, a down signal will be generated, but if the feedback signal is lagging the reference signal, an up signal will be generated. At step 706, an output of a voltage controlled oscillator (VCO) is modified based on the up signal or the down signal. The VCO operates such that a frequency of the signal output will be increased or decreased proportionally to the magnitude of the up signal or the down signal respectively. At step 708, an arithmetic operation is performed on the output of the VCO to generate an updated feedback signal, as discussed herein. In this way, the frequency of the feedback signal can be increased or decreased depending on the configuration of the arithmetic operator. For example, the arithmetic operator can be configured to multiply the frequency by a positive number greater than one thereby causing the resulting updated feedback signal to have an increased frequency. At step 710, the output of the VCO is delayed in order to provide an output clock signal, which is offset from the input clock signal according to the delay. In this way, by controlling the delay or offset of the output clock signal, edge alignment of the output clock signal with another signal such as a frame rate signal, line sync signal, and/or horizontal sync signal can be improved. Moreover, by controlling the arithmetic operation to increase or decrease the frequency of the VCO output, a variety of output clock signals with different frequencies can be generated for improving synchronization with other signals being transmitted within a display device.

Figure 8:
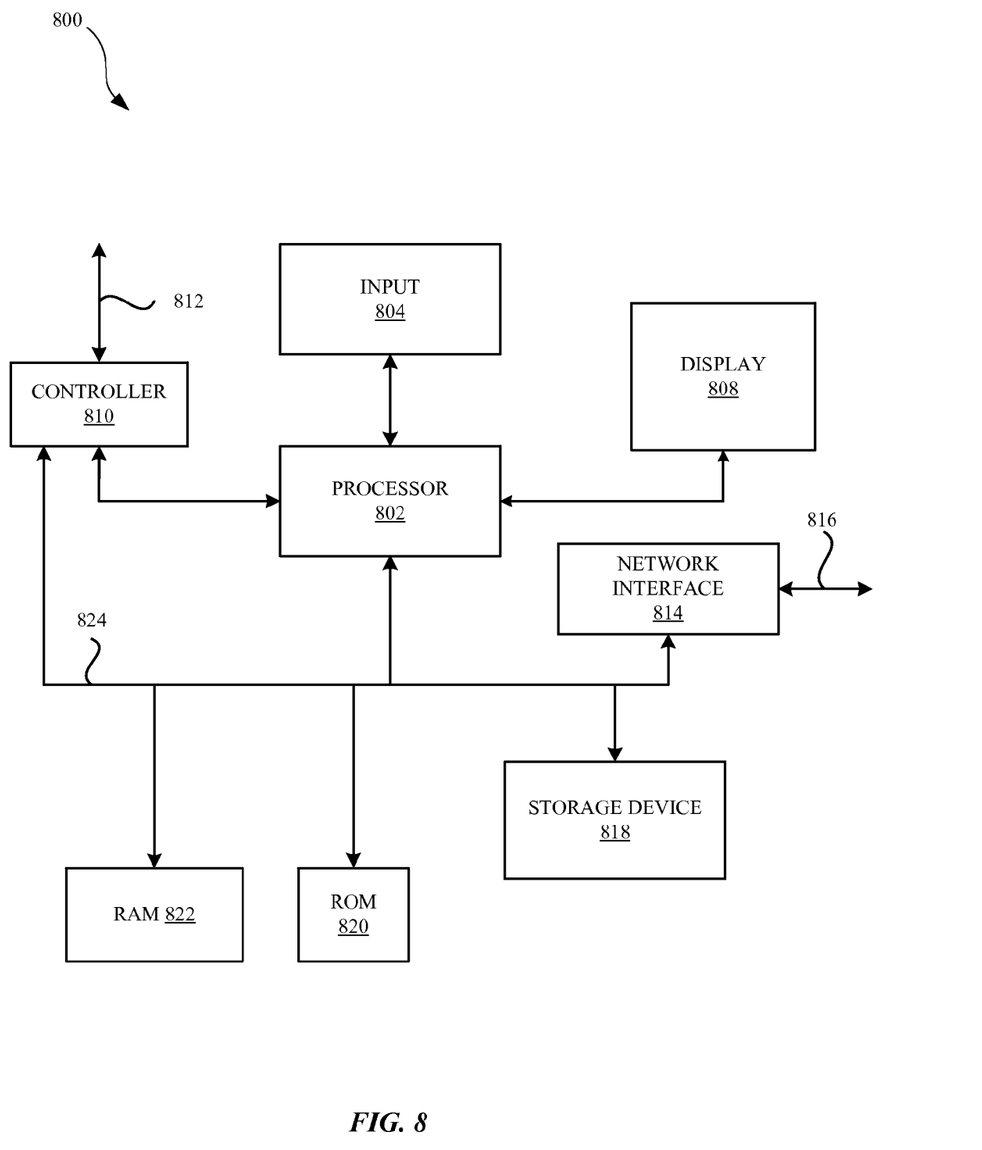
FIG. 8 is a block diagram of a computing device that can represent any of the systems, apparatus, and/or modules discussed herein.

FIG. 8 is a block diagram of a computing device 800 that can represent the components of the synchronization block, backlight driver, delay module, system 100, 200, or 300, or any of the systems, apparatus, and/or modules discussed herein. It will be appreciated that the components, devices or elements illustrated in and described with respect to FIG. 8 may not be mandatory and thus some may be omitted in certain embodiments. The computing device 800 can include a processor 802 that represents a microprocessor, a coprocessor, circuitry and/or a controller for controlling the overall operation of computing device 800. Although illustrated as a single processor, it can be appreciated that the processor 802 can include a number of processors. The number of processors can be in operative communication with each other and can be collectively configured to perform one or more functionalities of the computing device 800 as described herein. In some embodiments, the processor 802 can be configured to execute instructions that can be stored at the computing device 800 and/or that can be otherwise accessible to the processor 802. As such, whether configured by hardware or by a combination of hardware and software, the processor 802 can be capable of performing operations and actions in accordance with embodiments described herein.

The computing device 800 can also include user input device 804 that allows a user of the computing device 800 to interact with the computing device 800. For example, user input device 804 can take a variety of forms, such as a button, keypad, dial, touch screen, audio input interface, visual/image capture input interface, input in the form of sensor data, etc. Still further, the computing device 800 can include a display 808 (screen display) that can be controlled by processor 802 to display information to a user. Controller 810 can be used to interface with and control different equipment through equipment control bus 812. The computing device 800 can also include a network/bus interface 814 that couples to data link 816. Data link 816 can allow the computing device 800 to couple to a host computer or to accessory devices. The data link 816 can be provided over a wired connection or a wireless connection. In the case of a wireless connection, network/bus interface 814 can include a wireless transceiver.

The computing device 800 can also include a storage device 818, which can have a single disk or a number of disks (e.g., hard drives) and a storage management module that manages one or more partitions (also referred to herein as "logical volumes") within the storage device 818. In some embodiments, the storage device 818 can include flash memory, semiconductor (solid state) memory or the like. Still further, the computing device 800 can include Read-Only Memory (ROM) 820 and Random Access Memory (RAM) 822. The ROM 820 can store programs, code, instructions, utilities or processes to be executed in a non-volatile manner. The RAM 822 can provide volatile data storage, and store instructions related to components of the storage management module that are configured to carry out the various techniques described herein. The computing device 800 can further include data bus 824. Data bus 824 can facilitate data and signal transfer between at least processor 802, controller 810, network interface 814, storage device 818, ROM 820, and RAM 822.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A control circuit for a display device, the control circuit comprising:
  a phase detection module configured to concurrently receive a frequency-scaled (FS) feedback signal and an input clock signal, and provide a phase adjustment signal;
  a voltage controlled oscillator (VCO) connected to: (i) the phase detection module, and (ii) separate arithmetic operators that are configured to provide the FS feedback signal and an output clock signal based on the phase adjustment signal;
  a delay module, coupled to a first arithmetic operator of the separate arithmetic operators, wherein: i) the delay module comprises one or more selectable gate delays and ii) the delay module is configured to offset, by a delay value, a pulse edge of the output clock signal from a pulse edge of the input clock signal; and a dimming generator coupled to an output of the delay module, wherein the delay value is based on a clock rate of the dimming generator.

2. The control circuit of claim 1, wherein the delay module includes a decoding component connected to a plurality of multiplexers.

3. The control circuit of claim 2, wherein the delay module includes a first inverter connected to an input of a first multiplexer of the plurality of multiplexers, and a second inverter connected to an output of a second multiplexer of the plurality of multiplexers.

4. The control circuit of claim 3, wherein an inverter output of the second inverter is communicatively coupled to the dimming generator.

5. The control circuit of claim 2, wherein the separate arithmetic operators are directly connected to the VCO.

6. The control circuit of claim 1, wherein the dimming generator is a pulse width modulation (PWM) dimming generator.

7. The control circuit of claim 1, wherein the delay value is further based on a panel resolution of the display device.

8. A method for operating a display device, the method comprising:

concurrently receiving, by a phase detection module of the display device, a frequency-scaled (FS) feedback signal and an input clock signal;

providing a phase adjustment signal to a voltage controlled oscillator (VCO) of the display device, wherein the VCO is connected to separate arithmetic operators that provide the FS feedback signal and an output clock signal based on the phase adjustment signal;

delaying, by a delay module, the output clock signal by a delay value to produce a delay module output; and operating a dimming generator based on the delay module output, wherein the delay value is based on a clock rate of the dimming generator.

9. The method of claim 8, wherein the delay module includes a first inverter directly connected at an input of the delay module and a second inverter directly connected at an output of the delay module.

10. The method of claim 8, wherein the delay module includes a plurality of multiplexers, and each multiplexer of the plurality of multiplexers corresponds to a different delay value.

11. The method of claim 8, wherein the delay module comprises two or more inverters.

12. The method of claim 8, wherein the separate arithmetic operators are directly connected to the VCO.

13. The method of claim 8, wherein the dimming generator is a pulse width modulation (PWM) dimming generator.

14. The method of claim 8, wherein the delay value is further based on a panel resolution of the display device.

15. A computing device, comprising:

a display device; and a display circuit connected to the display device, the display circuit comprising:

a phase detection module configured to concurrently receive a feedback signal and an input clock signal, and provide a phase adjustment signal;

a voltage controlled oscillator (VCO) connected to (i) the phase detection module and (ii) separate arithmetic operators that are configured to provide the feedback signal and generate an output clock signal based on the phase adjustment signal;

a delay module coupled to an output of the VCO, wherein: i) the delay module comprises one or more selectable gate delays, and ii) the delay module is configured to offset, by a delay value, a pulse edge of the output clock signal from a pulse edge of the input clock signal; and a dimming generator coupled to an output of the delay module, wherein the delay value is based on a panel resolution of the display device, wherein the delay value is further based on a clock rate of the dimming generator.

16. The computing device of claim 15, wherein the delay module comprises two or more inverters.

17. The computing device of claim 15, wherein the input clock signal is a frame rate signal.

18. The computing device of claim 15, wherein the delay module is configured to receive an 8-bit delay signal capable of indicating 256 different delay values.

19. The computing device of claim 15, wherein the dimming generator is a pulse width modulation (PWM) dimming generator.

* * * * *